United States Patent
Hayashi et al.

(10) Patent No.: US 7,336,567 B2
(45) Date of Patent: Feb. 26, 2008

(54) OPTICAL HEAD DEVICE HAVING AN OBJECTIVE LENS HOLDER SUPPORTED BY COMPOSITE WIRES AND SINGLE WIRES

(75) Inventors: Yoshio Hayashi, Nagano (JP); Atsuhiro Hanaoka, Nagano (JP)

(73) Assignee: NIDEC Sankyo Corporation, Nagano (JP)

( * ) Notice: Subject to any disclaimer, the term of this patent is extended or adjusted under 35 U.S.C. 154(b) by 585 days.

(21) Appl. No.: 10/830,748

(22) Filed: Apr. 23, 2004

(65) Prior Publication Data
US 2005/0007899 A1 Jan. 13, 2005

(30) Foreign Application Priority Data
Apr. 24, 2003 (JP) ............................. 2003-119505

(51) Int. Cl.
*G11B 7/08* (2006.01)
(52) U.S. Cl. .................................... 369/44.15; 720/683
(58) Field of Classification Search ...................... None
See application file for complete search history.

(56) References Cited

U.S. PATENT DOCUMENTS 6,342,978 B1 * 1/2002 Nishikawa et al. ......... 359/813
6,496,451 B2 * 12/2002 Kimura et al. ........... 369/44.14
7,082,084 B2 * 7/2006 Kabasawa ................ 369/44.16
2004/0151085 A1 * 8/2004 Funakoshi et al. ....... 369/44.16

FOREIGN PATENT DOCUMENTS

| JP | 2001-195756 | 7/2001 |
|----|-------------|--------|
| JP | 2001-273652 | 10/2001 |

\* cited by examiner

*Primary Examiner*—Andrea Wellington
*Assistant Examiner*—Michael V Battaglia
(74) *Attorney, Agent, or Firm*—Reed Smith LLP

(57) ABSTRACT

An optical head device including a lens holder which holds an objective lens, six wires for supporting the lens holder and a holder support member which movably supports the lens holder by the six wires in a tracking, focusing and tilt direction. The six wires comprise two pairs, each of the pairs comprising a composite wire composed of two wires and a single wire composed of one wire which are respectively disposed on an upper side and a lower side of the lens holder in the focusing direction. The spring constant of the composite wire is set to be approximately equal to a spring constant of the single wire. Alternatively, the six wires may be disposed on the same circumference with respect to a drive center in the tilt direction or the spring constant of one wire of the pair may be set to be smaller than spring constants of the other two wires of the pair.

5 Claims, 4 Drawing Sheets

OPTICAL HEAD DEVICE HAVING AN OBJECTIVE LENS HOLDER SUPPORTED BY COMPOSITE WIRES AND SINGLE WIRES

CROSS REFERENCE TO RELATED APPLICATIONS

This application claims priority to Japanese Application No. 2003-119505 filed Apr. 24, 2003, which is incorporated herein by reference.

BACKGROUND OF THE INVENTION a) Field of the Invention

The present invention relates to an optical head device which is used for recording into or reproduction from an optical record disk such as a CD or a DVD. More specifically, the present invention relates to a lens holder support mechanism which movably supports an objective lens in a tilt direction as well as a tracking direction and a focusing direction.

b) Description of the Related Art

In an optical head device which is used for recording into or reproduction from an optical record disk such as a CD or a DVD, a lens holder support mechanism with a wire suspension system has been known in which a lens holder provided with an objective lens is supported by wires such that the objective lens is capable of being driven in a tracking direction, a focusing direction and a tilt direction. The optical head device with the wire suspension system includes a lens holder which holds an objective lens, a lens holder support member which supports the lens holder with wires, and a magnetic drive mechanism for driving the lens holder in a tracking direction, a focusing direction and a tilt direction. The magnetic drive mechanism includes a focusing drive coil, a tracking drive coil, and a tilt drive coil provided on a side face of the lens holder and a tracking and focusing drive magnet and a focusing and tilt drive magnet provided on the lens holder support member.

As shown in FIG. 8, a lens holder 101 which holds an objective lens 100 is supported movably in the tracking direction "Tr", the focusing direction "Fo" and the tilt direction "Ti" by six wires 102, 103, 104, 105, 106 and 107. Three pieces of six wires 102 through 107 respectively constitute a set of wires, and their base end sides are fixed on a lens holder support member and their front end sides are fixed on both sides of the lens holder 101 in the tracking direction. Two sets of wires 102, 103, 104 and 105, 106, 107 are respectively fixed on the lens holder 101 such that each set of three wires are fixed at an upper, a lower and a middle position in the focusing direction "Fo". Required electric currents are respectively applied to a focusing drive coil, a tracking drive coil and a tilt drive coil through the wires 102, 103, 104 and 105, 106, 107. The wires 103 and 106 disposed between the upper and the lower wires 102, 104 and 105, 107 are used for applying an electric current to the tilt drive coil.

In the optical head device with the wire suspension system constructed such that the objective lens 100 is movable in the tilt direction "Ti", six wires 102, 103, 104, 105, 106 and 107 fixed on both sides of the lens holder 101 are respectively made of the same material and the same diameter of wire (cross sectional area) as shown in FIG. 8. Two sets of wires 102, 103, 104 and 105, 106, 107 are respectively disposed with an equal interval in the focusing direction "Fo".

According to the construction described above, the supply of energy to the tilt drive coil can be simplified. However, the wires 103 and 106 disposed at the middle position in the focusing direction "Fo" may provide an unnecessary thrust force to the lens holder 101 at the time of the movement of the objective lens 100. Therefore, when the lens holder 101 is subjected to a rolling motion by applying an electric current to the tilt drive coil to control in the tilt direction "Ti", the objective lens 100 may occur a tilt movement which is not expected.

SUMMARY OF THE INVENTION

In view of the problems described above, it is an object and advantage of the present invention to provide an optical head device which does not incur an unexpected tilt movement with a simple construction at the time of performing the tilt drive as well as the focusing and the tracking drives.

In order to achieve the above advantage, according to the present invention, there is provided an optical head device including an objective lens which converges an emitted beam from a light source to an optical recording medium, a lens holder which holds the objective lens, a plurality of wires for supporting the lens holder, and a holder support member which movably supports the lens holder by the plurality of wires in a tracking direction, a focusing direction and a tilt direction. The plurality of wires comprising two pairs and each of the pairs includes a composite wire composed of two wires and a single wire composed of one wire, and the composite wire and the single wire are disposed on an upper side and a lower side of the lens holder in the focusing direction and each pair is disposed on both sides of the lens holder in the tracking direction. The base end sides of the composite wire and the single wire are respectively fixed to the holder support member and the front end sides of the composite wire and the single wire are respectively fixed to the lens holder. The spring constant of the composite wire is set to be approximately equal to the spring constant of the single wire.

According to the optical head device having such construction, the spring constant of the composite wire comprising two wires and the spring constant of the single wire comprising one wire, which are disposed on right and left sides of the lens holder in the tracking direction, are set to be approximately equal to each other. Therefore, the occurrence of the unexpected tilt can be prevented when the lens holder is driven in the tilt direction as well as in the focusing and tracking directions.

In the optical head device in accordance with an embodiment of the present invention, the length of the single wire and the length of one wire of the composite wire of each pair are set to be approximately equal to each other and the length of the other wire of the composite wire is set to be longer than that of the one wire of the composite wire.

According to the optical head device having such construction, the length of the other wire of the composite wire is set to be longer than that of the one wire of the composite wire. Therefore, the spring constant of the other wire of the composite wire can be made further smaller than that of the one wire. Accordingly, the other wire of the composite wire does not apply bad influence to the movement of the lens holder and thus unexpected tilt movement caused by the other wire can be prevented.

In the optical head device in accordance with an embodiment of the present invention, the single wire and the composite wire of each pair are respectively fixed and connected to the wiring pattern of a circuit board which is mounted on the holder support member, and the single wire and the one wire of the composite wire are respectively fixed at the same fixing position provided on the lens holder and the other wire of the composite wire is fixed on the lens holder at a further more front side position than the fixing position provided on the lens holder. According to the optical head device having such construction, the difference of the lengths of the other wire of the composite wire and the single wire or the one wire of the composite wire can be easily varied by shifting the fixed positions to the fixing part provided on the lens holder.

In the optical head device in accordance with an embodiment of the present invention, the single wire and the one wire of the composite wire are soldered to the wiring patterns of a circuit board provided on the front side of the lens holder, and a fixed position to the lens holder of the other wire of the composite wire is a soldered position to the wiring pattern of the circuit board. According to the optical head device having such construction, the other wire of the composite wire is only soldered to the wiring pattern of the circuit board for connecting with the lens holder and, as a result, the length of the other wire of the composite wire are set to be longer than the one wire of the composite wire.

In the optical head device in accordance with an embodiment of the present invention, the respective spring constants of the single wires of two pairs are set to be equal to each other.

According to the optical head device having such construction, the spring constants of the single wires of the respective pairs are set to be equal to each other and thus the spring constants in the right and left sides in the tracking direction become equal to each other. Therefore, the occurrence of the unexpected tilt can be prevented.

Also, in order to achieve the above advantage, according to the present invention, there is provided an optical head device including an objective lens which converges an emitted beam from a light source to an optical recording medium, a lens holder which holds the objective lens, six wires for supporting the lens holder, and a holder support member which movably supports the lens holder by the six wires in a tracking direction, a focusing direction and a tilt direction. Each three of the six wires are constituted as a pair, the base end sides of the six wires are fixed to the holder support member, the front end sides of the six wires are fixed on both sides of the lens holder in the tracking direction, the respective three of the six wires are fixed in the lens holder in a separated parallel manner in the focusing direction, and the six wires are disposed on the same circumference with respect to a drive center in the tilt direction.

According to the optical head device having such construction, the six wires are disposed on the same circumference with respect to the drive center of the tilt drive and thus all the wires are located at an equal distance with respect to the drive center. Therefore, even when three pieces of wires are respectively fixed on both sides of the lens holder in the tracking direction, the unexpected movement of the tilt angle of the objective lens due to the rolling motion of the lens holder can be prevented.

In the optical head device in accordance with an embodiment of the present invention, the respective spring constants of the six wires are set to be equal to each other.

According to the optical head device having such construction, the respective spring constants of the six wires disposed on the same circumference are set to be equal to each other and thus even when three pieces of wires are respectively fixed on both sides of the lens holder in the tracking direction, the unexpected movement of the tilt angle of the objective lens can be prevented.

In the optical head device in accordance with an embodiment of the present invention, each three of the six wires are constituted as a pair, the spring constant of a wire of the pair disposed at a middle position of the lens holder in the focusing direction is set to be smaller than the spring constants of wires of the pair disposed at an upper and a lower positions in the focusing direction.

According to the optical head device having such construction, the spring constant of the wire disposed at the middle position of the lens holder in the focusing direction is set to be smaller and thus the influence due to the wire at the middle position is reduced and the unexpected movement of the tilt angle of the objective lens can be prevented.

Also, in order to achieve the above object and advantage, according to the present invention, there is provided an optical head device including an objective lens which converges an emitted beam from a light source to an optical recording medium, a lens holder which holds the objective lens, six wires for supporting the lens holder, and a holder support member which movably supports the lens holder by six wires in a tracking direction, a focusing direction and a tilt direction. Each three of the six wires are constituted as a pair, and the spring constant of one wire of the pair is set to be smaller than the spring constants of the other two wires of the pair.

According to the optical head device having such construction, the spring constant of one wire disposed at a middle position of the pair is set to be smaller than the spring constants of the other two wires of the pair. Therefore, the unexpected movement of the tilt angle of the objective lens can be prevented.

In the optical head device in accordance with an embodiment of the present invention, the lengths of the other two wires of the pair are set to be approximately equal to each other and the length of the one wire disposed at a middle position of the pair is set to be longer than the length of the other two wires.

According to the optical head device having such construction, the length of the one wire disposed at a middle position of the pair is set to be longer than the length of the other two wires. Therefore, the spring constant of the one wire disposed at a middle position of the pair becomes smaller and the influence due to the one wire is reduced. Accordingly, the unexpected movement of the tilt angle of the objective lens can be prevented.

In the optical head device in accordance with an embodiment of the present invention, the one wire of the pair is provided to be sagged between the front end side fixed portion where the front end side of the one wire is fixed on the lens holder and the base end side fixed portion where the base end side of the one wire is fixed to the holder support member.

According to the optical head device having such construction, the spring constant becomes remarkably smaller by providing the one wire to be sagged between the front end side fixed portion and the base end side fixed portion. Therefore, the influence due to the one wire is reduced and the unexpected movement of the tilt angle of the objective lens can be prevented.

In the optical head device in accordance with an embodiment of the present invention, the one wire of the pair is formed of material having plasticity.

According to the optical head device having such construction, the one wire of the pair is made of material having plasticity whose spring constant is small and thus the influence due to the wire at a middle position can be further reduced.

Other features and advantages of the invention will be apparent from the following detailed description, taken in conjunction with the accompanying drawings that illustrate, by way of example, various features of embodiments of the invention.

DETAILED DESCRIPTION OF THE PREFERRED EMBODIMENTS

Optical head devices in accordance with embodiments of the present invention will be described below with reference to the accompanying drawings.

An optical head device performs recording or reproducing information into or from an optical record disk such as a CD or a DVD. The optical head device is constructed such that a laser beam emitted from a laser light source is reflected by a half mirror and converged by an objective lens to focus on an information record face of the optical record disk. The light beam reflected by the optical record disk is incident on a photo detector through the objective lens and the half mirror to perform an information reproduction processing based on optical signals detected by the photo detector. Further, the operation of an objective lens drive mechanism is controlled based on the output signal from the photo detector in such a manner that the position and angle of the objective lens in the tracking, focusing and tilt directions are servo controlled and the operation of the laser light source is controlled. The operation of the objective lens is controlled by the objective lens drive mechanism with a wire suspension system shown in FIG. 1.

Figure 1:
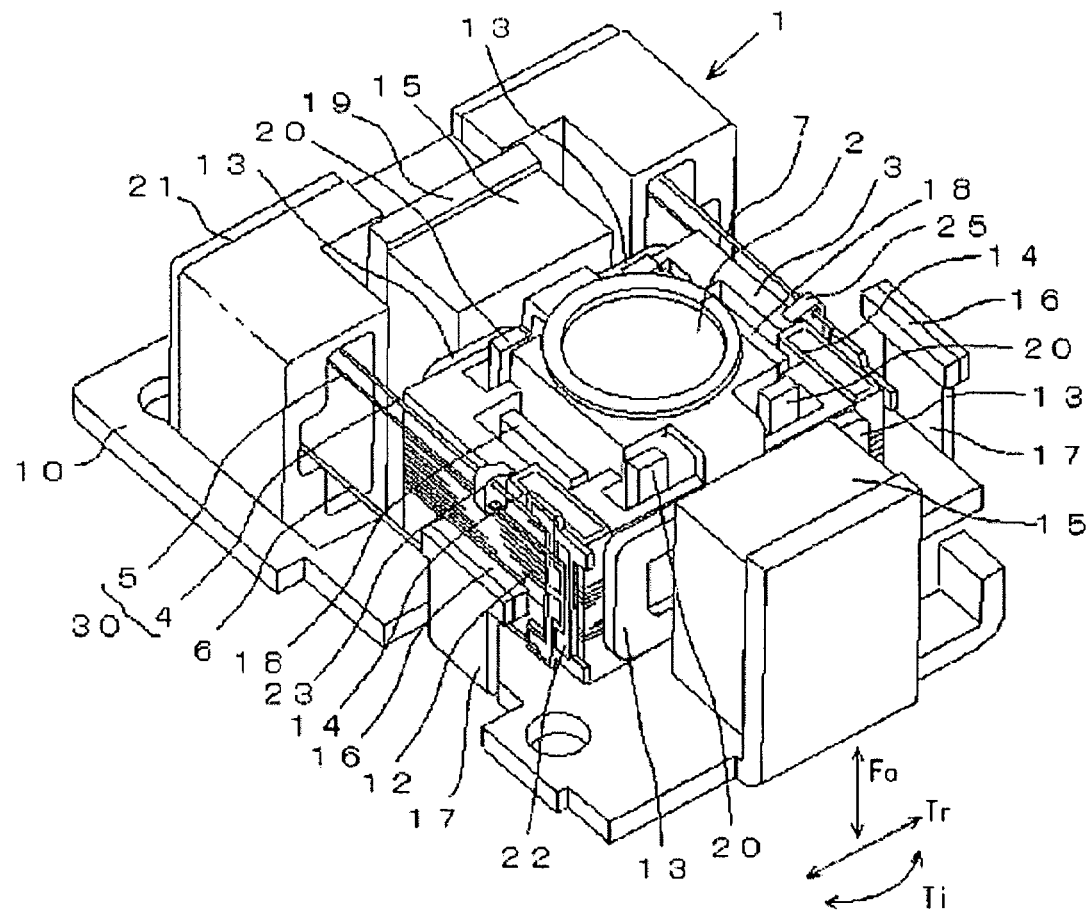
FIG. 1 is a perspective view showing an objective lens drive mechanism of an optical head device in accordance with a first embodiment of the present invention.

FIG. 1 is a perspective view showing an objective lens drive mechanism of an optical head device in a first embodiment of the present invention. The objective lens drive mechanism 1 includes a lens holder 3 holding an objective lens 2, a holder support member 10 supporting a lens holder 3 with six wires 4, 5, 6, 7, 8 and 9 (wires 8 and 9 are not shown in the drawing), and a magnetic drive mechanism 11 for driving the lens holder 3 in the tracking direction as shown by the arrow "Tr", the focusing direction as shown by the arrow "Fo", and the tilt direction as shown by the arrow "Ti". The wires respectively constitute a current path for applying an electric current to a focusing drive coil 12, tracking drive coils 13 and tilt drive coils 14.

The magnetic drive mechanism 11 is provided with a ring-shaped focusing drive coil 12 provided on the outer peripheral face of the body portion of the lens holder 3, tracking drive coils 13 formed of four flat coils which are adhesively put on the outer face of the focusing drive coil 12, and a pair of tilt drive coils 14. The holder support member 10 is provided with a pair of tracking-and-focusing drive magnets 15 which respectively face the focusing drive coil 12 and the tracking drive coils 13, and a pair of focusing-and-tilt drive magnets 16 which respectively face the focusing drive coil 12 and the tilt drive coil 14.

The focusing-and-tilt drive magnet 16 is fixed on an inner face of an outer yoke 17 which is formed erected from a bottom plate of the holder support member 10 on outer side of the lens holder 3 in the tracking direction "Tr". Further, the holder support member 10 includes an inner yoke 18 formed erected at a position facing to the inner face of the outside yoke 17.

A pair of tracking-and-focusing drive magnet 15 are respectively fixed on an inner face of a pair of outer yokes 19 which are formed erected from the bottom plate of the holder support member 10 in the direction orthogonal to the focusing-and-tilt drive magnets 16. Further, the holder support member 10 includes inner yokes 20 formed erected on the inner side of the lens holder 3 at a position facing to the inner face of the outer yoke 19.

In the objective lens drive mechanism 1 constructed above, the focusing drive coil 12 faces the focusing-and-tilt drive magnets 16 and the tracking-and-focusing drive magnets 15. Therefore, a required electric current is applied to the focusing drive coil 12 through the wires to drive the lens holder 3 in the focusing direction "Fo".

The tilt drive coils 14 respectively face the focusing-and-tilt drive magnets 16. A required electric current is applied to the tilt drive coils 14 through the wires to drive the lens holder 3 in the tilt direction "Ti".

The tracking drive coils 13 respectively face the tracking-and-focusing drive magnets 15. A required electric current is applied to the tracking drive coils 13 through the wires to drive the lens holder 3 in the tracking direction "Tr".

Figure 2:
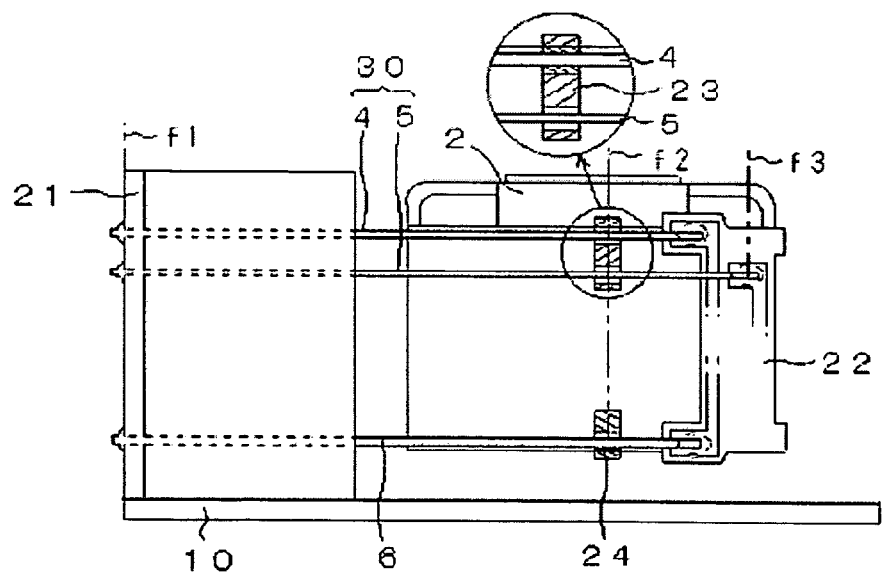
FIG. 2 is a side view showing the objective lens drive mechanism shown in FIG. 1.

The lens holder 3 holding the objective lens 2 is movably supported by six wires 4, 5, 6, . . . having a prescribed spring constant in the tracking direction "Tr", in the focusing direction "Fo" and in the tilt direction "Ti". The wires 4, 5, 6, . . . , three pieces of which are set in pairs, are arranged on both outer side faces of the lens holder 3 in the tracking direction "Tr" as shown in FIG. 2. The wires 4 and 6 are disposed on the upper and the lower sides of the lens holder 3 in the focusing direction "Fo" and the wire 5 is disposed on the upper side of the center position between the wire 4 and the wire 6 in the focusing direction "Fo", that is, near or approximately at the position of the wire 4. The wires 4, 6 and 5 are disposed in parallel one another so as to be separated at the upper, the lower and the intermediate positions of the lens holder 3 in the focusing direction "Fo". The pairs comprising three wires are symmetrically arranged on both sides of the lens holder 3 in the tracking direction "Tr" and constructed in the same manner. Therefore, in FIG. 2, only one pair consisting of the wires 4, 5 and 6 is described and the description of the other pair of the wires is omitted.

The base end portions of the wires 4, 5 and 6 constituting the above-mentioned one pair are respectively fixed by soldering on a wiring pattern of a circuit board 21, for example, a printed circuit board or the like, which is perpendicularly mounted on the holder support member 10. Further, the front end sides of the wires 4 and 6 are respectively fixed in the fixing parts 23 and 24 provided on the front side of the lens holder 3 by means of, for example, an adhesive or the like. The front end portions of the wires 4 and 6 are respectively connected by using a solder to the wiring patterns of a circuit board 22 such as a printed circuit board, which is attached adhesively on the front side of the lens holder 3.

The front end side of the wire 5 positioned adjacent to the wire 4 is passed through a through hole portion formed in the fixing part 23 and the front end portion of the wire 5 is electrically connected to the wiring pattern on the circuit board 22 by using solder and thus fixed to the circuit board 22. The inner diameter of the through hole portion is formed to be sufficiently larger than the outer diameter of the wire 5 and thus the movement of the wire 5 is not restricted. As described above, the wire 5 is not fixed to the lens holder 3 at the position of the fixing part 23. Therefore, the position where the wire 5 is soldered on the wiring pattern of the circuit board 22 becomes the fixing part in which the wire 5 is fixed to the lens holder 3. This position is a further more front side position than the fixing parts 23, 24 of the lens holder 3 for the wires 4 and 6.

The pair comprising the wires 4, 5 and 6 is handled as being constituted of a composite wire 30 comprising two wires 4 and 5, and a single wire comprising the wire 6. The spring constant of the composite wire 30 and the spring constant of the single wire 6 are set to be approximately or substantially equal to each other. Therefore, they are approximately or substantially equal to each other with respect to the drive center of the lens holder 3 in the focusing direction "Fo". The wire 4 of the composite wire 30 is referred to as a primary wire 4, the intermediate wire 5 of the composite wire 30 is referred to as a secondary wire 5 and the wire 6 is referred to as a single wire 6.

The wires 4, 5 and 6 are respectively made of elastic metal material such as beryllium copper and phosphor bronze in a circular shape. The size of the outer diameter of the wires 4, 5 and 6 is, for example, in the range of about 0.08 to 1.5 mm and each of the wires 4, 5 and 6 is provided with a prescribed spring constant.

The length from a base end side fixed point "f1" where the primary wire 4 of the composite wire 30 is fixed to the circuit board 21 which is mounted on the holder support member 10 to a front end side fixed point "f2" where the primary wire 4 is fixed to the fixing part 23 of the lens holder 3 is set to be equal to the length from a base end side fixed point "f1" where the single wire 6 is fixed to the circuit board 21 to a front end side fixed point "f2" where the single wire 6 is fixed to the fixing part 24 of the lens holder 3. The cross sectional area of the primary wire 4 is set to be a little smaller than that of the single wire 6. Therefore, the spring constant of the primary wire 4 is also a little smaller than that of the single wire 6.

On the other hand, the cross sectional area of the secondary wire 5 is set to be smaller than that of the primary wire 4. In addition, the length of the secondary wire 5 from the base end side fixed point "f1" to the front end side fixed point "f3" fixed on the circuit board 22 is set to be longer than that of the primary wire 4 or the single wire 6. Therefore, the spring constant of the secondary wire 5 becomes to be extremely smaller than that of the primary wire 4. As constructed above, the composite spring constant of the composite wire 30 consisting of the primary wire 4 and the secondary wire 5 is set to be approximately or substantially equal to the spring constant of the single wire 6.

Alternatively, even when the lengths of the primary wire 4 and the single wire 6 are the same as or longer than that of the secondary wire 5, the primary wire 4 and the single wire 6 are fixed at the fixing parts 23 and 24 of the lens holder 3. Therefore, the spring constant of the secondary wire 5 can be smaller than the primary wire 4 and the single wire 6. Further, the position of the front end side fixed point "f3" of the secondary wire 5 may be not at the soldered connecting portion on the circuit board 22 as described above but at another fixing part of the lens holder 3 which is provided between the positions of the fixing part 23, 24 and the soldered connecting portion.

As described above, the spring constant of the composite wire 30 is set to be approximately or substantially equal to the spring constant of the single wire 6. Therefore, the spring constants are set to be approximately or substantially equal to each other with respect to the drive center of the lens holder 3 in the focusing direction "Fo". As a result, when the lens holder 3 is driven in the tracking direction "Tr", the construction is substantially equivalent to the state that the lens holder 3 is supported by the four wires comprising the two composite wires 30 and two single wires 6. Therefore, the lens holder 3 can be moved in an approximately or substantially parallel manner. Accordingly, when the tilt angle is controlled by applying an electric current to the tilt drive coils 14, unexpected tilt movement caused by the wire is prevented and accurate tilt control is enabled.

The cross sectional area of the secondary wire 5 of the composite wire 30 is set to be sufficiently smaller than that of the primary wire 4 or that of the single wire 6. In addition, when the length of the secondary wire 5 from the base end side fixed point "f1" to the front end side fixed point "f3" is made larger than that of the primary wire 4 or that of the single wire 6, the spring constant of the secondary wire 5 can be made extremely smaller. When such the secondary wire 5 constructed above is used, the same wire as the single wire 6 may be used as the primary wire 4. The secondary wire 5 is used, for example, as an electric current path to drive the tilt coil 14 and thus it is preferable that the wire size or the cross sectional area of the secondary wire 5 is set to be in the range that the current capacity is satisfied.

Figure 3:
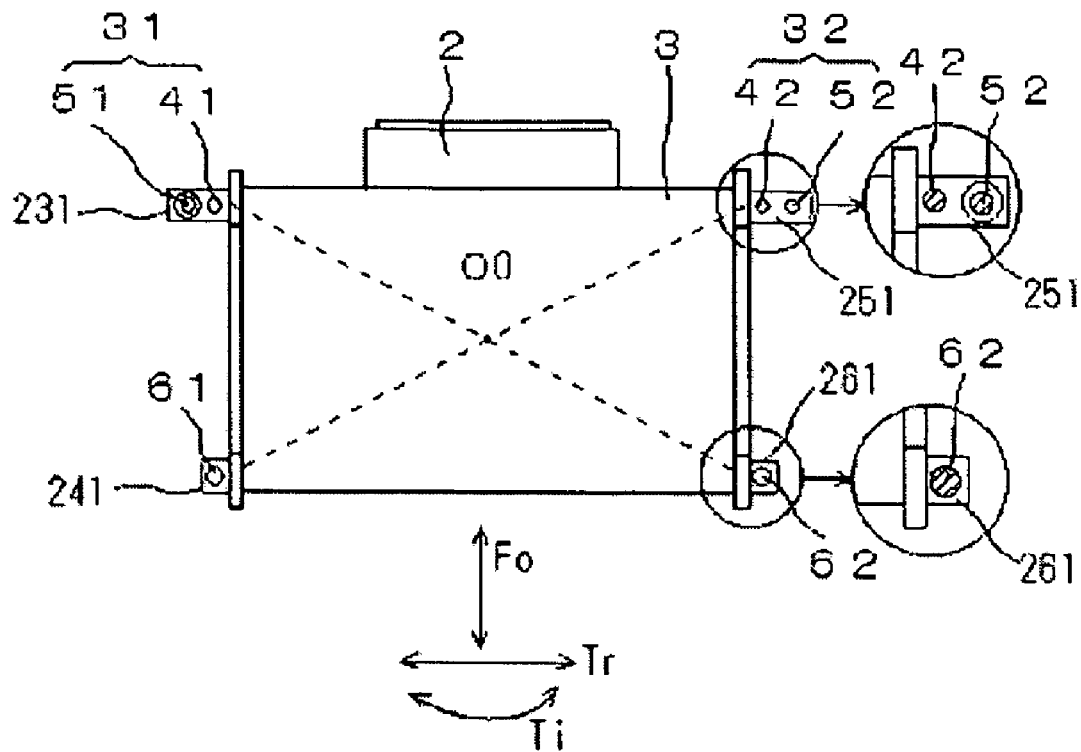
FIG. 3 is an explanatory front view showing an essential portion of an optical head device in accordance with a second embodiment of the present invention.

FIG. 3 is an explanatory front view showing an essential portion of an optical head device in accordance with a second embodiment of the present invention. In the second embodiment, the respective composite wires are disposed near the upper side on both side faces of the lens holder 3 so as to be placed in parallel in the horizontal direction outwardly. In other words, the respective base end portions of composite wires 31, 32 and single wires 61, 62 are fixed by soldering, as similar to the above-mentioned first embodiment, to wiring patterns of the circuit board 21 which is mounted upward on the holder support member 10. Further, the front end sides of the primary wires 41, 42 of the composite wires 31, 32 and the single wires 61, 62 are respectively fixed in the fixing parts 231, 241, 251 and 261 provided on the front side of the lens holder 3 by means of, for example, an adhesive or the like. The front end portions of the primary wires 41, 42 and the single wires 61, 62 are respectively connected by using a solder to the wiring patterns of a circuit board 22, which is attached further on the front end side on the lens holder 3.

The front end sides of the secondary wires 51, 52 of the composite wires 31, 32 are passed through hole formed in the fixing part 231, 251 as similar to the above-mentioned first embodiment, and the front end portions of the secondary wires 51, 52 are respectively electrically connected to the wiring patterns on the circuit board 22 by using solder and thus fixed to the circuit board 22. Therefore, the length from the base end side fixed point "f1" where the primary wires 41, 42 of the composite wires 31, 32 are fixed to the circuit board 21 mounted on the holder support member 10 to the front end side fixed point "f2" where the primary wires 41, 42 are fixed to the fixing parts 231, 251 of the lens holder 3 is set to be equal to the length from the base end side fixed point "f1" where the single wires 61, 62 are fixed to the circuit board 21 to the front end side fixed point "f2" where the single wires 61, 62 are fixed to the fixing parts 241, 261 of the lens holder 3. On the other hand, the length of the secondary wires 51, 52 from the base end side fixed point "f1" to the front end side fixed point "f3" fixed on the circuit board 22 is set to be longer than that of the primary wires 41, 42 or the single wires 61, 62 as similar to the above-mentioned first embodiment.

Also in the second embodiment, as similar to the above-mentioned first embodiment, the respective spring constants of the composite wires 31, 32 comprising of the primary wires 41, 42 and the secondary wires 51, 52, which are arranged near the upper side of the lens holder 3, are approximately or substantially equal to the spring constants of the single wires 61, 62 which are arranged on the lower side of the lens holder 3. As a result, when the lens holder 3 is driven in the tracking direction "Tr", the construction is substantially equivalent to the state that the lens holder 3 is supported by the four wires comprising the two composite wires 31, 32 and two single wires 61, 62. Therefore, the lens holder 3 can be moved in an approximately or substantially parallel manner. Accordingly, when the tilt angle is controlled by applying an electric current to the tilt drive coils 14, unexpected tilt movement caused by the wire is prevented and accurate tilt control is enabled.

Figure 4:
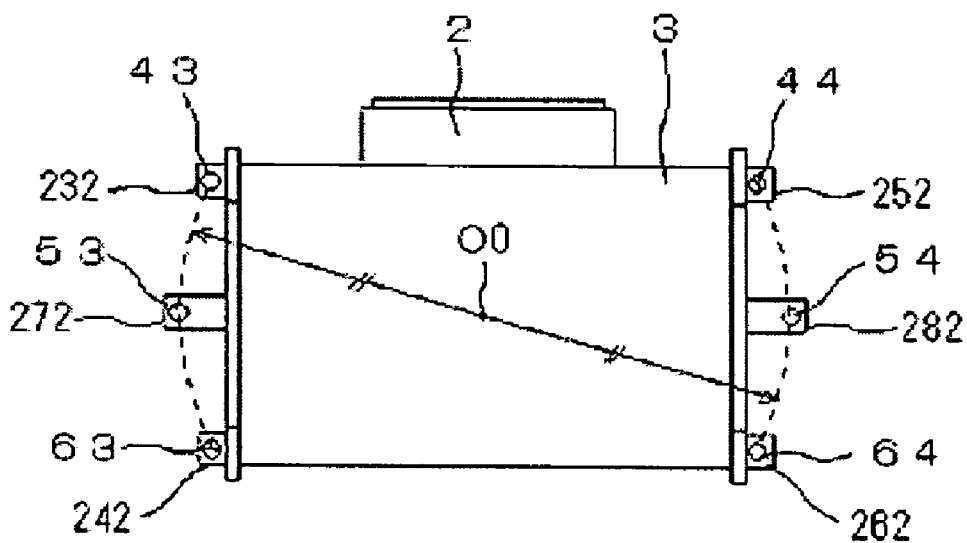
FIG. 4 is an explanatory front view showing an essential portion of an optical head device in accordance with a third embodiment of the present invention.

FIG. 4 is an explanatory front view showing an essential portion of an optical head device in accordance with a third embodiment of the present invention. The third embodiment is constructed as shown in FIG. 4 such that six wires are disposed on the same circumference when the lens holder 3 is viewed from the front side, that is, assuming a circle swinging in the tilt direction. Further, the six wires are constructed such that the respective spring constants of the six wires are set to be substantially equal to one another with respect to the drive center of the lens holder 3 in the tilt direction. The wires 43, 53, 63 and 44, 54, 64 constituting the respective pairs are made of a metal rod wire with same diameter, same length and same cross sectional area.

The respective base end portions of the wires 43, 53, 63 and 44, 54, 64 are fixed by soldering, as similar to the above-mentioned first embodiment, to wiring patterns of the circuit board 21. Further, the front end sides of the wires 43, 53, 63 and 44, 54, 64 are respectively fixed in fixing parts 232, 242, 252, 262, 272 and 282 provided on the front side of the lens holder 3. The front end portions of the primary wires 43, 53, 63 and 44, 54, 64 extended from the fixing parts 232, 242, 252, 262, 272 and 282 are respectively connected to the wiring patterns of a circuit board 22, which is attached further on the front end side on the lens holder 3. Accordingly, the respective lengths of the wires 43, 53, 63 and 44, 54, 64 from the base end side fixed point "f1" to the front end side fixed point "f2" are set to be equal to each other.

Further, the six wires 43, 53, 63 and 44, 54, 64 constituting a pair comprising of three wires are disposed on the same circumference having a prescribed radius from the drive center "O0" of the tilt drive.

When the six wires 43, 53, 63 and 44, 54, 64 are disposed on the same circumference with respect to the drive center "O0" of the tilt drive, all the wires are located at an equal distance with respect to the drive center "O0". Therefore, when the lens holder 3 is driven in the tilt direction "Ti", the displacement of the drive center "O0" of the tilt drive does not occur since the lens holder 3 swings about the drive center "O0". Further, the respective fixed positions of the six wires 43, 53, 63 and 44, 54, 64 are located at an equal distance with respect to the drive center "O0". Therefore, even when three pieces of wires are respectively fixed on both sides of the lens holder 3 in the tracking direction "Tr", the unexpected movement of the tilt angle of the objective lens 2 due to the rolling motion of the lens holder 3 can be prevented.

Figure 5:
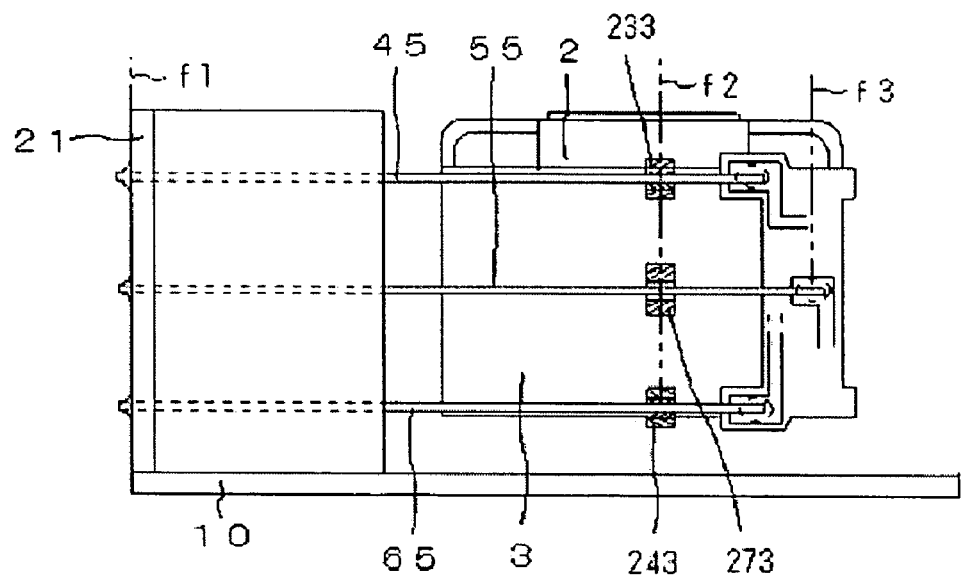
FIG. 5 is an explanatory side view showing an essential portion of an optical head device in accordance with a fourth embodiment of the present invention.

FIG. 5 is an explanatory side view showing an essential portion of an optical head device in accordance with a fourth embodiment of the present invention. In the fourth embodiment, three wires are disposed as a pair on both outer sides of the lens holder 3 in the tracking direction "Tr". Each of the wires 45, 65 are disposed on the upper side and the lower side of the lens holder 3 in the focusing direction "Fo" and the wire 55 is disposed at a center position in the focusing direction "Fo". The pairs comprising three wires are constructed to be symmetrical on both sides of the lens holder 3 in the tracking direction "Tr". Therefore, only one pair comprising the wires 45, 55, 65 is described and the description of the other pair is omitted.

In FIG. 5, the respective wires 45, 65 disposed on the upper side and the lower side of the lens holder 3 are made of rod-shaped material with the same diameter and the same length. Further, the cross sectional areas of the wires 45, 65 are the same and thus their inherent spring constants are also the same. The wire 55 disposed at a substantially center position of the lens holder 3 in the focusing direction "Fo" is set to be smaller in its cross sectional area than the wires 45, 65 and longer in its length than the wires 45, 65.

The respective base end portions of the wires 45, 55 and 65 are fixed by soldering to wiring patterns of the circuit board 21. Further, the front end sides of the wires 45, 65 are respectively fixed in fixing parts 233, 243 provided on the front side of the lens holder 3. The front end portions of the wires 45, 65 extended from the fixing parts 233, 243 are respectively connected to the wiring patterns of a circuit board 22, which is attached on the further front end side on the lens holder 3. Accordingly, the respective lengths of the wires 45, 65 from the base end side fixed point "f1" to the front end side fixed point "f2" are set to be equal to each other.

The front end side of the wire 55 positioned at the substantially center position is passed through a through hole portion formed in the fixing part 273 and the front end portion of the wire 55 is electrically connected to the wiring pattern on the circuit board 22 by using solder and thus fixed to the circuit board 22. Therefore, the length of the middle wire 55 from the base end side fixed point "f1" to the front end side fixed point "f3" fixed on the circuit board 22 is set to be longer than that of the wires 45, 65. The inner diameter of the through hole portion in the fixing part 273 is formed to be sufficiently larger than the outer diameter of the wire 55 and thus the movement of the wire 55 is not restricted.

As described above, the cross sectional area of the middle wire 55 is set to be smaller than those of the wires 45, 65 and the length of the middle wire 55 from the base end side fixed point "f1" to the front end side fixed point "f3" is set to be longer than those of the wires 45, 65. Therefore, the spring constant of the middle wire 55 becomes to be extremely smaller than those of the wires 45, 65. As a result, the construction described above is substantially equivalent to the state that the lens holder 3 is supported by the four wires and thus the lens holder 3 can be moved in a substantially parallel manner. Accordingly, when the tilt angle is controlled by applying an electric current to the tilt drive coils 14, unexpected tilt movement caused by the wire is prevented and accurate tilt control is enabled.

Figure 6:
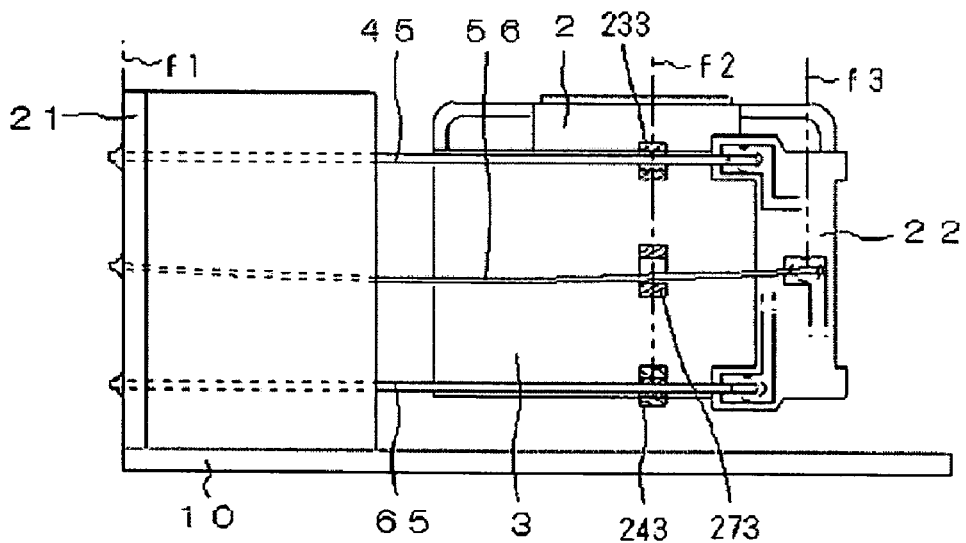
FIG. 6 is an explanatory side view showing an essential portion of an optical head device in accordance with a fifth embodiment of the present invention.

FIG. 6 is an explanatory side view showing an essential portion of an optical head device in accordance with a fifth embodiment of the present invention. The fifth embodiment is a modified example of the fourth embodiment shown in FIG. 5, which is constructed to reduce the influence of the wire disposed at the middle position. Also in the fifth embodiment, the pairs comprising three wires are constructed to be symmetrical on both sides of the lens holder 3 in the tracking direction "Tr". Therefore, only one pair comprising the wires 46, 56, 66 is described.

In FIG. 6, the construction which is different from the fourth embodiment shown in FIG. 5 is that the length of the middle wire 56 from the base end side fixed point "f1" to the front end side fixed point "f3" is set to be longer than the distance between the base end side fixed point "f1" and the front end side fixed point "f3", that is, the middle wire 56 is fixed so as to be sagged.

The spring constant of the middle wire 56 disposed between the wires 45 and 65 becomes remarkably smaller by sagging the wire 56. Therefore, the influence of the middle wire 56 at the time when the lens holder 3 is driven in the tracking direction "Tr" can be further reduced. When the spring constant of the wire 56 is significantly small, the influence of the middle wire 56 can be substantially ignored.

The wire 56 disposed between the wires 45 and 65 may be made of metal material having electroconductivity or a component member such as a flexible circuit board, which have plasticity such that the inherent spring constant of the wire 56 is smaller than those of the upper and lower wires 45, 65 to reduce the influence of the wire 56 further more. The metal material or the flexible circuit board having such plasticity is provided with a prescribed spring constant and it is not adequate to ignore the spring constant. Therefore, even when the metal material having plasticity is used, it is preferable that the spring constants including the wires 45, 65 are set to be approximately or substantially equal to each other.

Figure 7:
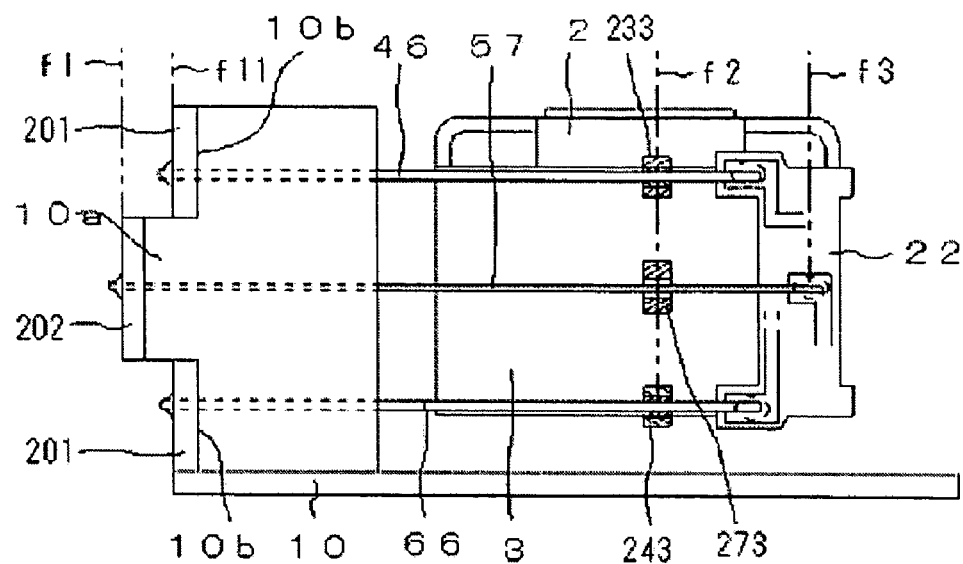
FIG. 7 is an explanatory side view showing an essential portion of an optical head device in accordance with a sixth embodiment of the present invention.
Figure 8:
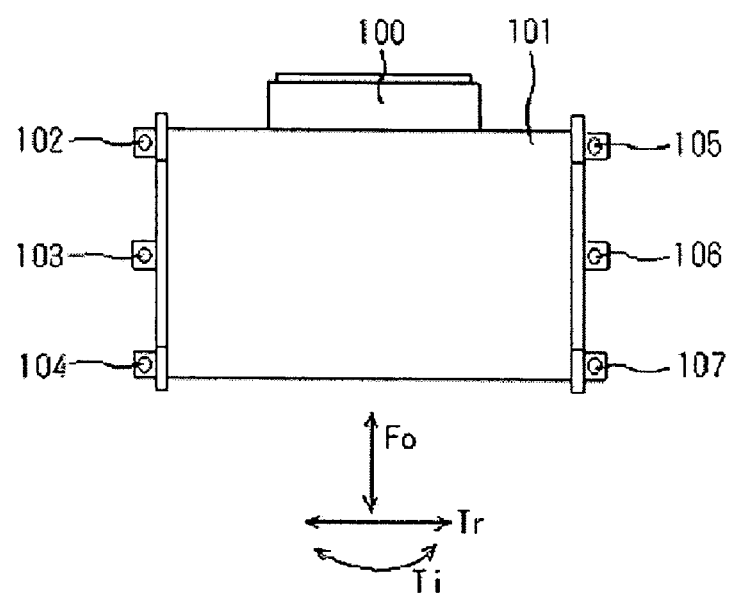
FIG. 8 is an explanatory front view showing a conventional optical head device.

FIG. 7 is an explanatory side view showing an essential portion of an optical head device in accordance with a sixth embodiment of the present invention. The sixth embodiment is a modified example of the fourth embodiment shown in FIG. 5, which is constructed to reduce the influence of the wire disposed at the center position. Also in the sixth embodiment, the pairs comprising three wires are constructed to be symmetrical on both sides of the lens holder 3 in the tracking direction "Tr". Therefore, only one pair comprising the wires 46, 56, 66 is described.

In FIG. 7, the construction which is different from the fourth embodiment shown in FIG. 5 is that the base end side fixed point "f1" is shifted toward base side direction from the base end side fixed point "f11" of the wires 46, 66 and the length of the middle wire 57 is further extended to make the spring constant further smaller.

A protruded part 10*a* is formed on a center portion of the rear end part on the holder support member 10 and two recessed parts 10*b* are formed on the upper side and the lower side of the rear end part. Printed circuit boards 201, 202 are respectively mounted on the protruded part 10*a* and the recessed parts 10*b*. The respective base end portions of the wires 46, 66 disposed on the upper and the lower sides of the lens holder 3 are fixed by soldering to wiring patterns of the circuit board 201. The base end portion of the wire 57 disposed at the center position between the wires 46 and 66 is fixed by soldering to the wiring pattern of the circuit board 202. The front end portions of the wires 46, 57, 66 are electrically connected to the wiring patterns of the circuit board 22 as similar to the fourth embodiment shown in FIG. 5. In addition, the cross sectional area of the wire 57 at the center position is set to be made smaller than those of the wires 46, 66.

As described above, the length of the wire 57 disposed at the center position becomes further longer than those of the wires 46, 66 disposed on the upper side and the lower side of the lens holder 3. This is because the wire 57 is fixed at the base end side fixed point "f1" of the circuit board 201 on the protruded part 10*a* formed at the rear end part of the holder support member 10 and the wires 46, 66 are fixed at the base end side fixed point "f11" where the point "f11" is positioned on the further front side. Therefore, the spring constant of the wire 57 becomes further smaller.

When the wire 57 and the wires 46, 66 are constructed such that the difference of their spring constants become larger as described above, the influence of the wire 57 disposed at the center position is reduced. T Alternatively, the protruded part 10*a* and the recessed part 10*b* formed at the rear end part of the holder support member 10 are relatively replaced with each other. Therefore, the base end side fixed point "f11" of the circuit board 201 attached on the recessed part 10*b* may be set to the position of the above-mentioned base end side fixed point "f1" and the circuit board 202 attached on the protruded part 10*a* may be set to the position of the base end side fixed point "f11". However, in this case, the front end side fixed point "f3" is sufficiently shifted in the front side to make the spring constant of the wire 57 sufficiently small.

Although the present invention has been shown and described with reference to specific preferred embodiments, various changes and modifications will be apparent to those skilled in the art from the teachings herein. For example, the objective lens drive mechanism 1 may not be limited to the above-mentioned mechanism but may be constructed in another mechanism. Further, the wire may be a metal rod in a circular cross-sectional shape but may be a streamline wire in an approximately rectangular cross-sectional shape for all or part of the six wires. In addition, in the above-mentioned embodiments, the base end side fixed point and the front end side fixed point in the middle position wire are respectively fixed to the wiring pattern of the circuit board. However, they may be fixed to another insulation member without using the printed circuit board.

As described above, in the optical head device in accordance with the embodiments of the present invention, the spring constants of the respective wires, which are disposed on right and left sides of the lens holder in the tracking direction, are set to be approximately equal to each other with respect to the center in the focusing direction. Therefore, the occurrence of the unexpected tilt can be prevented when the lens holder is driven in the tilt direction as well as in the focusing and tracking directions. Further, since each three pieces of the wires having a prescribed spring constant as described above are used, the optical head device can be easily constructed at a low cost.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical head device comprising:
an objective lens for converging an emitted beam from a light source to an optical recording medium;
a lens holder for holding the objective lens;
a plurality of wires for supporting the lens holder; and
a holder support member for movably supporting the lens holder by the plurality of wires in a tracking direction, a focusing direction and a tilt direction;
said plurality of wires comprising two pairs, each of the pairs further comprising a composite wire composed of two wires and a single wire composed of one wire which are respectively disposed on an upper side and a lower side of the lens holder in the focusing direction, each pair being disposed on both sides of the lens holder in the tracking direction, the base end sides of the composite wire and the single wire being respectively fixed to the holder support member and the front end sides of the composite wire and the single wire being respectively fixed to the lens holder, and a spring constant of the composite wire being set to be approximately equal to a spring constant of the single wire.

2. The optical head device according to claim 1, wherein the length of single wire and the length of one wire of the composite wire of each pair are set to be approximately equal to each other and the length of the other wire of the composite wire is set to be longer than that of the one wire of the composite wire.

3. The optical head device according to claim 2, wherein the single wire and the composite wire of each pair are respectively fixed and connected to a wiring pattern of a circuit board which is mounted on the holder support member, the single wire and the one wire of the composite wire being respectively fixed at a same fixing position provided on the lens holder, and the other wire of the composite wire being fixed on the lens holder at a further more front side position than the fixing position provided on the lens holder.

4. The optical head device according to claim 3, wherein the single wire and the one wire of the composite wire are soldered to wiring patterns of a circuit board provided on a front side of the lens holder, and wherein a fixed position to the lens holder of the other wire of the composite wire is a soldered position to a wiring pattern of a circuit board provided on the front side of the lens holder.

5. The optical head device according to claim 1, wherein the respective spring constants of the single wires of two pairs are set to be equal to each other.

* * * * *